Patented May 30, 1950

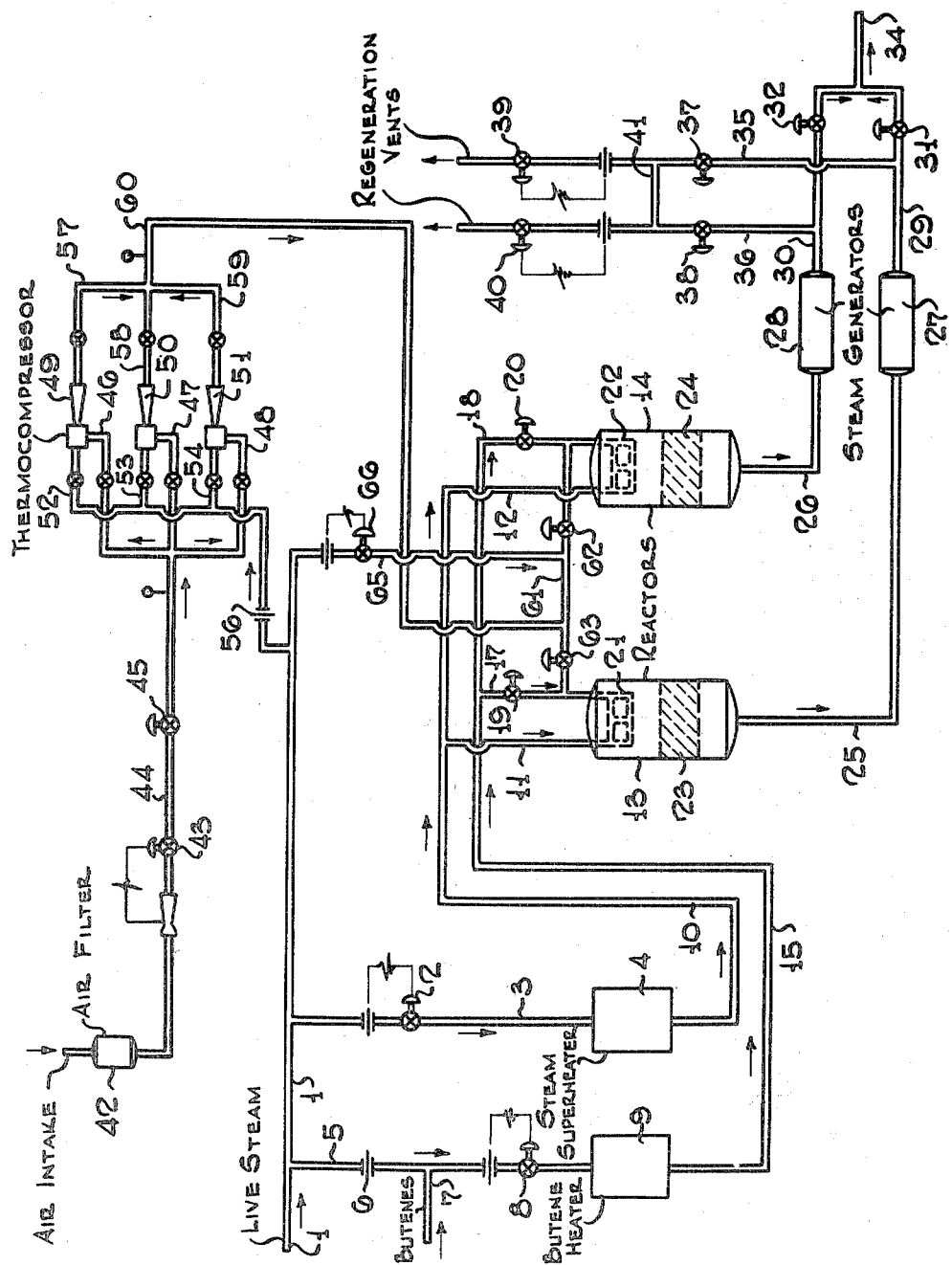

2,509,900

UNITED STATES PATENT OFFICE 2,509,900

METHOD FOR SUPPLYING TEMPERING STEAM AND REGENERATION GAS TO A CATALYST

Donald J. Wormith, Sarnia, Ontario, Canada, assignor to Standard Oil Development Company, a corporation of Delaware Application October 12, 1946, Serial No. 702,990

2 Claims. (Cl. 196—52)

This invention relates to a method and means for supplying tempering steam and air in conditioning and regenerating a catalyst which becomes deactivated by carbonaceous deposits but which is highly active in the presence of steam. More particularly, this invention is concerned with using a steam jet thermocompressor for supplying the tempering steam in appropriately controlling the temperature of the catalyst and for supplying regenerating air or oxygen-containing gas with tempering steam in reactivating the catalyst.

Certain catalysts developed for selective decomposition reactions and syntheses for low boiling hydrocarbons at elevated temperature function satisfactorily when large proportions of steam are present with reactants at elevated temperatures and require periodic regeneration under controlled conditions. These catalysts are impaired if inadequately regenerated or if heated too severely during regeneration. Moreover, these catalysts cannot be used in a commercial process unless their period of regeneration is made short and timely.

In the dehydrogenation of mono-olefins to di-olefins and in the dehydrogenation of alkyl aromatics to aryl alkenes at elevated temperatures, suitable catalysts for these reactions in which large proportions of steam are present with a hydrocarbon reactant are typified by magnesia-iron oxide, magnesia-chromia, chromate-alumina, zinc oxide-iron oxide, nickel phosphate, and similar combinations of such metal oxides and metal salts. The activity of this type of catalyst is not inhibited by large proportions of steam, and large proportions of high temperature steam are important for obtaining high selectivity in the reaction.

The reactors containing the type of catalyst mentioned in existing plants have been designed in pairs so that regeneration of catalyst can be carried out in one reactor while reaction is carried out in the other. In general, the reactors are provided with equipment for switching them automatically from reaction to regeneration and vice versa at intervals while maintaining continuous production so that the feed streams continuously flow at controlled rates through the heaters prior to entering a reactor on stream for reaction. It will be appreciated that the coordination of alternate operations in the reactors is important and depends on proper adjustment of several factors.

An object of this invention is to provide a method and means for accomplishing a coordinated regeneration of a catalyst employed on a steam-reactant feed with advantages hereinafter set forth.

In a preferred embodiment this invention is applied to a process wherein a vaporized hydrocarbon feed is admixed with superheated steam when contacted at an elevated temperature with a fixed bed of catalyst during the reaction period, the superheated steam boosting the temperature of the mixture to the desired reaction temperature level. During the regeneration period, while the vaporized hydrocarbon feed is shut off to the catalyst bed, the temperature of the catalyst is controlled through replacement of the vaporized hydrocarbon feed by tempering steam until the catalyst is purged of volatile hydrocarbons. After the purging, oxygen-containing regeneration gas or air is admitted in suitable proportions with tempering steam for timely and adequate combustion of carbonaceous deposits, after which the regenerated catalyst is purged of combustion products and brought back to reaction conditions.

For example, in the selective dehydrogenation of normal butylene to butadiene, a feed stream of $C_4$ hydrocarbons containing a high concentration of normal butylene is preheated and vaporized at a sufficiently low temperature to avoid thermal decomposition before the vapors enter a fixed catalyst bed. The vaporized hydrocarbons are diluted with about 10 to 15 volumes of superheated steam per volume of n-butylene in the preheated hydrocarbon feed about to enter the fixed catalyst bed, and a low positive pressure is maintained in the reaction zone containing the catalyst bed.

The invention will be described more particularly with reference to the accompanying drawing which shows diagrammatically a flow-plan of a double reactor unit and its regeneration facilities.

Referring to the drawing, steam is passed from a main line 1 through a flow control valve 2 in line 3 to the steam superheater 4. A smaller amount of steam from main line 1 is passed through line 5 and through flow meter 6 for mixing with the hydrocarbon feed from line 7. The mixture of steam from line 5 with the hydrocarbon feed is passed through flow regulator 8 to the heater 9.

Superheated steam from superheater 4 is passed through line 10 to its branches 11 and 12, branch 11 entering reactor 13 and branch 12 entering reactor 14. The heated hydrocarbon feed is passed from its heater 9 through line 15 to its branches 17 and 18, branch 17 entering reactor 13 and branch 18 entering reactor 14. Valves 19 and 20 in branches 17 and 18, respectively, are adapted for motor-operated timer control so that each of the reactors is alternately on stream and off stream for the heated feed of vaporized hydrocarbon reactant as the valves 19 and 20 are switched automatically on or off. The superheated steam and the hydrocarbon feed, preheated in the separate heating zones or separate furnaces, are mixed in either reactor 13 or 14, whichever is on stream for reaction, in a nozzle or mechanical type mixer 21 or 22 in reactors 13 and 14, respectively. Each of these gaseous fluid mixers is disposed near a fixed catalyst bed 23 in reactor 13 and bed 24 in reactor 14.

The steam supplied during reaction from superheater 4 is superheated to a temperature of about 200 to 400 Fahrenheit degrees higher than the hydrocarbon feed from its heater 9 in order to obtain adequate high reaction temperature and avoid thermal cracking of the hydrocarbon before it reaches the catalyst bed. The hydrocarbon feed from its heater 9 is at a temperature below the reaction temperature, e. g., about 900° F. to 1000° F. but on being mixed with sufficient superheated steam is brought up to the catalytic reaction temperature, e. g., 1180° F. or thereabout.

All the preheated hydrocarbon feed stream from line 15 and most of the superheated steam from line 10 is passed through the reactor on stream for reaction, the remainder of superheated steam from line 10 being passed through the regenerating reactor. For instance, with valve 20 closed and valve 19 open, all the hydrocarbon feed from line 15 is passed into mixer 21 of reactor 13 to be admixed therein with most of the superheated steam from line 10 and its branch 11. The remainder of superheated steam in line 10 is passed by its branch 12 to reactor 14. Gaseous products of reaction or of regeneration and purged gases are withdrawn from reactors 13 and 14 through lines 25 and 26, respectively, and the withdrawn gaseous products are passed through heat exchangers 27 and 28 which may serve as steam generators when extracting heat to cool the withdrawn gaseous products.

The cooled gaseous products of reaction are led from the heat exchanger units 27 and 28 through lines 29 and 30, each of which is provided with a timer control valve 31 and 32, respectively. When one of these timer control valves is open, the gaseous products are passed therethrough into the main product line 34 which conducts gaseous products of reaction to a recovery unit not shown. The recovery unit will contain conventional quenching, fractionating, and scrubbing means.

Vent lines 35 and 36 are connected into the lines 29 and 30 up stream from the timer control valves 31 and 32 to remove regeneration and purging gas at periods when said timer control valves are closed. The vent lines 35 and 36 are also fitted with timer control valves 37 and 38, followed by flow regulator valves 39 and 40. A by-pass 41 interconnects the vent lines for the purpose of equalizing the pressure on the pair of reactors while the reactors are being changed from reaction to regeneration and from regeneration to reaction.

During operation, when reactor 13 is on stream for reaction, timer control valve 37 is closed and timer control valve 31 is open for delivery of cooled gaseous products of reaction from heat exchanger 27, e. g., at about 550° F., into the main product recovery line 34. Reactor 14 being at the same time on regeneration, its product outlet timer control valve 32 is closed and timer control valve 38 is open for venting cooled gaseous products of regeneration.

When a reactor in the system is cut off stream from the reactant feed, the catalyst bed in the reactor must first be purged of volatile hydrocarbon reactant material, then lowered in temperature before a controlled amount of oxygen-containing regeneration gas is admitted for burning of carbonaceous deposits. Thus, in bringing reactor 14 into the regeneration phase, timer control valve 20 is closed and tempering steam is supplied to the reactor in place of the reactant feed before air or oxygen-containing regeneration gas is admitted without having to shut off the line 10 or its branch 12 supplying superheated steam from superheater 4.

It will be noted that in accordance with the present invention suitable regeneration conditions and proper air rate requirements are fulfilled by utilizing a steam jet thermocompressor for making available a jet of tempering steam from yard live steam and for inspirating air at an adequate rate from about atmospheric pressure level, the pressure drop from the pressure of yard live steam to the reactor pressure efficiently providing the energy needed for compressing the regeneration air. Accordingly, the present invention eliminates the need of mechanical compressors for compressing the regeneration air to the regeneration pressure level.

To accomplish injection of regeneration air with steam jet thermocompressors in the system illustrated, atmosphere air is drawn through an air filter represented by 42. This air filter may be of any conventional type for removing dust particles from air without imposing an excessive pressure drop. The filtered air is drawn through a flow regulator valve 43 in line 44, thence through a timer control valve 45 when it is opened. Air passing through the open valve 45 flows through one or more air inlets in branches 46, 47, and 48 of steam jet thermocompressors 49, 50, and 51. Each of these steam jet thermocompressors has a Venturi nozzle construction similar to that of a steam ejector and they are connected in parallel through steam branch inlets 52, 53, and 54 with the steam header line 55, which receives live yard steam from main line 1 through flow meter 56. Any of the steam thermocompressors can be kept out of operation by manually closing valves in their respective air and steam inlet connections. The compressors discharge through parallel outlet connections 57, 58, and 59 to a header line 60.

Since it is important that the jet thermocompressors be designed for a particular capacity range, it is desirable to provide a plurality of jets in parallel as shown so that the supply of air may be varied with requirements. Normally, one or two of the jets may be used as spares.

Tempering steam alone or mixed with air, at the time that timer control valve 45 is open, is conducted from one or more of the jets in operation through the header outlet line 60 to a distributing line 61 which is connected into both of the reactant feed inlets 17 and 18, following the positions of the timer control valves 19 and 20 in these feed inlets. Timer control valves 62 and 63 are located in the distributing line 61 at opposite sides to control the flow of the tempering steam or mixture of tempering steam with regeneration air into either of the feed inlets 17 or 18. As a matter of extra precaution, line 65 is connected from the distributing line to the main yard steam line 1 through a flow regulator 66 to insure an adequate supply of tempering steam when the steam jet thermocompressors do not supply the needed capacity, but normally there is no flow through line 65.

The sequence of steps and periods in a typical cycle of operation in the unit described is as follows:

(1) *Reaction period.*—Superheated steam and hydrocarbon feed flow into reactor 13 from branch inlets 11 and 17, timer control valves 19 and 31 being open and timer control valves 37 and 63 being closed. The hydrocarbon feed mixed with superheated steam from mixer 21 flows through catalyst bed 23 at a constant rate and at a temperature level of about 1180° F. for about one hour.

(2) *Start of purge.*—Timer control valve 17 is closed to cut off hydrocarbon reactant feed and outlet valve 31 is partly closed to reduce flow of superheated steam from branch inlet 11 into reactor 13.

(3) *Temperature lowering at end of purge.*—Timer control valve 63 is opened to admit tempering steam without air from steam jet thermocompressors, air inlet timer control valve 45 being closed, timer control valve 31 now being completely closed, and timer control vent valve 37 being open.

(4) *Regeneration period.*—Air inlet timer control valve 45 opens to allow air flow to steam jet thermocompressor concurrently with steam thereto, and superheated steam at reduced flow rate mixes with air and tempering steam in mixer 21 to flow through catalyst bed 23 at a temperature of about 1140° F.

(5) *After-purge and depressuring.*—Valve 45 is now closed to cut off air while tempering steam and superheated steam continue to flow into reactor 13 to flush out air.

(6) *Start of reaction period.*—Venting valve 37 is now closed and reactant feed branch inlet valve 19 is opened so that the reactant feed enters reactor 13 with superheated steam, then valve 63 closes to cut off tempering steam, allowing temperature to rise and bringing the reactor 13 back to its initial reaction phase.

During periods (2) to (5) in reactor 13, reactor 14 is placed on stream to receive the reactant feed stream and most of the superheated steam during its reaction period.

It will be noted that superheated steam may continuously enter each of the reactors during all phases of the cycle, yet the flow rate of the superheated steam and the temperature in the reactors are controlled by operation of valves in other inlet lines and in the reactor outlet lines. In this manner of operation, no valve is present in an extremely high temperature line 10. The operation is simplified and maintenance is low.

Only one motor-operated control valve has to be provided to control the air flow to the steam jet compressors. This valve may be an openshut type, positioned with respect to an automatic timer, to open a certain number of minutes after closing of the main product outlet valve for one of the reactors and to close a certain number of minutes before this main product outlet valve begins to open. This provides an ample period for temperature control and purging before and after regeneration with assurance of adequate regeneration while an alternate reactor is in a reaction phase.

Work carried out with a system such as described has demonstrated that commercial catalysts can be satisfactorily regenerated with 25 volumes of air per volume of catalyst per hour, which is equivalent to an air rate of approximately 1000 pounds per hour for a three-foot catalyst bed (catalyst volume = 530 cu. ft.).

The following representative operating conditions have been determined on the basis of an operation with a three-foot catalyst bed:

TABLE I

*Conditions of operation*

| | Lbs./hr. |
|---|---|
| Superheated steam: 1300° F.— | |
|   In superheater | 120,000 |
|   In butene furnace | 10,000 |
|     Total | 130,000 |
| To reactor | 103,000 |
| To regenerator | 27,000 |
|     Total | 130,000 |
| Tempering steam (minimum) | 7,000 |
| Air (minimum) | 1,000 |

Reactor mix temperature:
1180° F., reactor
1140° F., regeneration

On the basis of a three-foot catalyst bed with the operation conditions as shown in Table I, two steam jet thermocompressors will supply the required quantity of air at 50 pounds per square inch absolute operating on air at 13 pounds per square inch absolute intake pressure and using steam of 100° F. superheat quality at an intake pressure of 180 pounds per square inch gauge. The jets employed are preferably designed for better capacity than is normally necessary since it has been found that the discharge pressure of tempering steam mixed with air amounting to 25 to 35 pounds per square inch gauge was sufficient.

The system described has been simplified for the purposes of illustration and it is to be understood that the system may be modified in various respects. The system may include recording meters for flow, pressure, and temperature, timer control mechanisms of various types, and other instruments for control. The system may be enlarged to include several pairs of reactors.

I claim:

1. In a process of supplying steam to a plurality of reaction zones, each containing a catalyst periodically regenerated and on stream for reaction of organic vapor reactant during a cycle of operation, the improvement of continuously supplying a constant flow stream of steam superheated to above the catalyst temperature of said reaction zones, dividing said stream of superheated steam into portions which flow continuously into each of the reaction zones, admixing a stream of tempering steam at lower temperature with a portion of said superheated steam entering one of the reaction zones at a decreased flow rate on discontinuing the reaction period of the cycle in said reaction zone while a remaining portion of said superheated steam is passed at increased flow rate to at least one other reaction zone on stream for reaction, continuing the addition of said tempering steam to that portion of the superheated steam entering the reaction zone in which the catalyst is undergoing regeneration and thereafter until a stream of organic vapor reactant is again being added to the superheated stream entering the reaction zone to start the next reaction period in the same reaction zone, then to the reaction zone starting its next reaction period flowing the superheated steam at an increased flow rate mixed with organic vapor reactant thereto so that the temperature of the catalyst in said zone is brought back up to the desired reaction level.

2. In a process as described in claim 1, reducing the flow of superheated steam to the zone being changed from a reaction period to a regeneration period of its cycle by reducing flow of gaseous effluent from said zone while mixing the tempering steam with superheated steam entering said zone, then after a purging interval during which the temperature of the catalyst is lowered in said zone, supplying regeneration gas with tempering steam that is admixed with the superheated steam continuously entering said zone, stopping regeneration gas from entering said zone with the tempering steam during an after-purge interval, then increasing the flow of the superheated steam to said zone in starting its next reaction period by increasing the flow of gaseous effluent from said zone.

DONALD J. WORMITH.

REFERENCES CITED

The following references are of record in the file of this patent:

UNITED STATES PATENTS

| Number | Name | Date |
|---|---|---|
| 2,340,814 | Lidov | Feb. 1, 1944 |
| 2,398,186 | Loy | Apr. 9, 1946 |
| 2,399,560 | Murphree | Apr. 30, 1946 |